(12) United States Patent
Safoutin

(10) Patent No.: US 9,002,638 B2
(45) Date of Patent: Apr. 7, 2015

(54) METHOD AND APPARATUS FOR GEOMETRIC SEARCH AND DISPLAY FOR A DIGITAL MAP

(76) Inventor: Michael John Safoutin, Seattle, WA (US)

(*) Notice: Subject to any disclaimer, the term of this patent is extended or adjusted under 35 U.S.C. 154(b) by 850 days.

(21) Appl. No.: 11/520,265

(22) Filed: Sep. 13, 2006

(65) Prior Publication Data

US 2007/0061074 A1    Mar. 15, 2007

Related U.S. Application Data

(60) Provisional application No. 60/716,855, filed on Sep. 13, 2005.

(51) Int. Cl.
*G01C 21/00* (2006.01)
*G01C 21/36* (2006.01)
*G09B 29/10* (2006.01)

(52) U.S. Cl.
CPC .......... *G01C 21/3682* (2013.01); *G09B 29/106* (2013.01)

(58) Field of Classification Search
USPC .......................................... 701/208, 211, 200
See application file for complete search history.

(56) References Cited

U.S. PATENT DOCUMENTS

| | | | | |
|---|---|---|---|---|
| 3,298,022 A * | 1/1967 | Smith | | 342/55 |
| 3,975,662 A * | 8/1976 | Janosky | | 315/378 |
| 4,623,966 A * | 11/1986 | O'Sullivan | | 701/301 |
| 4,702,698 A * | 10/1987 | Beckwith et al. | | 434/2 |
| 4,759,716 A * | 7/1988 | Booker et al. | | 434/3 |
| 5,005,418 A * | 4/1991 | Anderson | | 73/625 |
| 5,473,343 A | 12/1995 | Kimmich et al. | | |
| 5,559,707 A * | 9/1996 | DeLorme et al. | | 701/200 |
| 5,838,334 A * | 11/1998 | Dye | | 345/503 |
| 5,948,040 A * | 9/1999 | DeLorme et al. | | 701/201 |
| 6,339,747 B1 * | 1/2002 | Daly et al. | | 702/3 |
| 6,542,814 B2 * | 4/2003 | Polidi et al. | | 701/208 |
| 6,978,935 B2 * | 12/2005 | Tsikos et al. | | 235/462.01 |
| 7,085,648 B2 * | 8/2006 | Ishiguro | | 701/208 |
| 7,305,396 B2 * | 12/2007 | Schmidt et al. | | 1/1 |
| 7,324,896 B1 * | 1/2008 | Smith | | 701/209 |
| 7,720,844 B2 * | 5/2010 | Chu et al. | | 707/724 |
| 2004/0001114 A1 * | 1/2004 | Fuchs et al. | | 345/855 |
| 2004/0243306 A1 * | 12/2004 | Han | | 701/211 |
| 2005/0085999 A1 * | 4/2005 | Onishi | | 701/211 |
| 2005/0285774 A1 * | 12/2005 | Wittenberg et al. | | 342/70 |
| 2006/0089788 A1 * | 4/2006 | Laverty | | 701/202 |
| 2006/0200541 A1 * | 9/2006 | Wikman et al. | | 709/223 |
| 2007/0287474 A1 * | 12/2007 | Jenkins et al. | | 455/456.2 |
| 2008/0046125 A1 * | 2/2008 | Myeong et al. | | 700/253 |
| 2009/0169060 A1 * | 7/2009 | Faenger et al. | | 382/113 |
| 2009/0172511 A1 * | 7/2009 | Decherd et al. | | 715/207 |
| 2009/0271105 A1 * | 10/2009 | Kindo et al. | | 701/201 |

* cited by examiner

*Primary Examiner* — John Q Nguyen
*Assistant Examiner* — Kyung Kim

(57) ABSTRACT

A geometric search and display method for a digital map includes a preferably animated graphic element projected on a map display, association of a search criterion with the graphic element, application of the search criterion to depicted or undepicted mapped or mappable items that geometrically intersect with the graphic element, and graphical representation of said application and/or outcome of said application by means of temporary modification of visual appearance of intersecting items and/or temporary modification of the visual appearance of the intersecting portion of the map.

19 Claims, 3 Drawing Sheets

METHOD AND APPARATUS FOR GEOMETRIC SEARCH AND DISPLAY FOR A DIGITAL MAP

CROSS-REFERENCE TO RELATED APPLICATIONS

This application claims the benefit of U.S. Provisional Application No. 60/716,855 filed Sep. 13, 2005.

STATEMENT REGARDING FEDERALLY SPONSORED RESEARCH OR DEVELOPMENT

Not Applicable

TECHNICAL FIELD

The present invention relates to the search and display of items on a digital map, such as the type of digital map typically displayed by means of a visual display device such as a computer screen.

BACKGROUND OF THE INVENTION

Digital maps are commonly employed to depict real-world features on a computer display. Typically the digital map acts to display a window or similar area representing a geographic coverage area upon which representations of geographic features that exist in the corresponding real-world geographic area may be mapped and depicted. Also typically a database representing mappable geographic features, such as for example roads, buildings, or points of interest, is maintained as a source of geographic location and other information that may be referenced as necessary for purposes such as selecting items to be mapped and determining their location and appearance on the map. (For the purpose of this discussion, the terms "feature" and "item" are used interchangeably to refer to entities that may be depicted on the digital map).

The depiction of real-world features on such a map or other 2- or 3-dimensional representation poses the problem of identifying specific features of interest among the possibly many other features depicted or eligible for depiction. For example, if a digital map depicts retail shops that exist within a geographic area, the user may be interested in identifying shops that sell a specific type of product. Because information about specific products carried might not be represented in the visual representation of each shop, it is likely to be necessary for the computer program that composes the digital map to access database information in order to identify shops that match this criteria, and then depict them in a different manner from the others, perhaps by highlighting or by application of a symbol such as a pushpin symbol, so that the user may distinguish them from other depicted features that do not match the criteria.

A number of methods are practiced in the prior art for the purpose of identifying and differentially depicting sought items. For example, several well known internet-based mapping services (such as Mapquest, for example) begin by presenting a digital map that initially depicts only a few important features such as roads and major landmarks, and the user is expected to specify a search criterion, perhaps by typing a keyword or business category, thereby commanding the map to additionally display previously undepicted items that match the criterion. Alternatively, such as with maps provided by Yahoo!, Inc. and other providers, the user may be asked to check one or more checkboxes or other controls in order to specify that items of corresponding predetermined categories become visible, leaving items in other categories invisible. For example, a checkbox labeled "grocery stores" might cause grocery stores to become depicted if checked.

One shortcoming of maps that show items selectively as described above, that is, only in response to user specification of one or more search criteria, is that many items of potential interest to the user may fail to become depicted, and thereby remain unknown to the user, simply because the user has not thought to specify a search criterion that would reveal them. On the other hand, the alternative strategy of showing every mappable feature simultaneously would likely cause the map to be so cluttered as to make it difficult for the user to discern items of interest.

Another shortcoming comes to light in applications in which the digital map depicts features whose attributes change frequently. Because digital maps as seen in the prior art rely on deliberate user action to compose and issue a search command that in turn determines what is to be displayed, it is possible that a displayed set of search results may become invalid with the passage of time. Suppose for example that the database contains information representing local retail shops and also the current inventory of each shop; and that this inventory is frequently updated in response to deliveries and sales of goods at each store. If the user wishes to identify stores that currently have in stock a specific product, and one of the matching stores runs out of the product after the search has been conducted, the change in matching status of this store would not be known to the user until and unless the user reissues the search command and thereby causes the display to be refreshed. Therefore, the prior art continues to pose the problem of applying and displaying the results of a search of dynamically changing items in a way that maintains validity of displayed results without requiring the user to repeatedly issue a search command, or requiring constant automatic update of the display.

Further, the search criterion is typically applied to database records by traversing the records as stored in memory space or disk storage in an order representing their relative position in memory space or on disk (for example, in an alphabetical or numeric order). Because the database of mappable items may be very large (perhaps covering an entire state or country), it would be preferable that only the geographically relevant portion of the database, that is, only the records pertaining to features within the geographic region currently within or near the geographic area of the map display, be searched. To this end, it is obvious to anyone skilled in the art that each database item might first undergo a preliminary test for geographic location to determine that the item is geographically within the area of interest and therefore eligible for further application of the search criterion. However, even this initial test may prove computationally burdensome, especially if the search criterion is repeatedly and continuously applied in order to keep the displayed results accurate over time. It would be preferable that even this initial geographic test be eliminated and that only a relatively small subset of items already known to be geographically eligible should participate in a given application of the search criterion.

BRIEF SUMMARY OF THE INVENTION

The present invention provides a new and unique way of locating and displaying items of interest on a digital map. The invention provides for an animated visual display that represents the application of a search criterion to a set of target items and the outcome of said application; and by which the identification and evaluation of target items for search is determined by and reactive to the movement of a projected shape across the digital map display.

Preferably, the invention employs a graphical mechanism suggestive of a simulated radar beam in order to perform a number of specific functions. A graphic element sweeps across a portion of the map display, thereby geometrically determining a subset of the database to which the search criterion will be applied. The sweeping movement of the graphic element is accompanied by a localized modification of the map display so as to communicate application of and/or outcome of the search. The sweeping movement also acts to update the search results on a frequent and regular basis, and also acts to provide a dynamic and graphical effect that is more engaging and entertaining than a simple static refresh of the display.

Generally, the invention includes a preferably animated graphic element projected on a map display, association of a search criterion with the graphic element, application of the search criterion to depicted or undepicted mapped or mappable items that geometrically intersect with the graphic element, and graphical representation of said application and/or outcome of said application by means of temporary modification of visual appearance of intersecting items and/or temporary modification of the visual appearance of the intersecting portion of the map.

More specifically, a preferably repetitive cycle includes the following general steps. A graphic element is defined and projected in a changing position on the map display. At any given position of the projected graphic element, mapped items whose mapped location or representation intersects with the projected graphic element are identified as target items. Target items are evaluated for match with a search criterion associated with the graphic element. The depicted appearance of each target item is considered for modification in a way conditional upon the state, degree, class, or other aspect of its match, and modified accordingly if applicable. For example, if a target item matches the search criterion, it might be redrawn in a brighter color, or at a larger size; the degree or nature of modification might be conditional upon the degree of match, including the possibility of no modification; if the matching target item was previously undepicted, it might become depicted. Once an item has thus been modified, in subsequent cycles a secondary modification or a sequence of incremental secondary modifications may optionally be carried out to suggest a systematic progression or decay from the initial state of modification toward a terminal state of modification. The terminal state of modification is preferably but not necessarily the original unmodified appearance of the target item, including if applicable an undepicted state.

In a preferred embodiment the method is implemented in a computer program as a repetitive cycle including the general steps of: (1) determining a shape and size of a graphic element and a position in which to project the graphic element on the map display; (2) projecting the graphic element in the specified position on the map display in a manner to be described; (3) identifying a set of target items consisting of mapped items whose depicted representation (or if undepicted, whose mapped location or potentially depicted representation) geometrically intersects with the projected graphic element; (4) determining a state, degree, class, or other aspect of match between database information associated with each identified target item and a search criterion associated with the projected graphic element; (5) determining and applying a first modification of the visual appearance of matching target items based on state, degree, class, or other aspect of match; (6) optionally determining and applying to targets first modified in a previous cycle a second modification consisting of one or more increments or members of a predetermined or computed sequence of modifications.

One advantage of the invention is in the constraining of the database so that only items geographically eligible are searched for match with the search criterion, providing for faster searching. Another advantage is in the fact that the beam's interaction with candidate database items in a graphical manner provides a basis for providing feedback during the progress of the search. Yet another advantage is in providing an entertaining visual representation of the search that is more interesting than a static display or automatic refreshing of the screen. Yet another advantage is in being responsive to changing attributes of searched items without requiring manual reissue of the search command by the user. Yet another advantage is in the animated visual effect bringing about a passive awareness of the mapped area in terms of a moment by moment matching of mappable items with the search criteria. Yet another advantage is in that a large number of nonmatching items may be depicted on the map simultaneously (perhaps even every mappable item), without compromising the ability to discern matching items by means of their interaction with the simulated radar beam.

No prior art has apparently been developed that includes a simulated radar beam as an integral part of a means for search and display purposes in the context of a digital map. U.S. Pat. No. 5,473,343 (Kimmich et al.) mentions, among other mechanisms, the animated simulation of a radar sweep as part of a method to communicate the location of a feature on a computer screen. However, that patent is concerned not with facilitating search nor display of items on a digital map or other medium, but only with the task of communicating the current position of a mouse cursor on a computer screen. As such its use of the radar motif is only for a cosmetic purpose and does not anticipate its application in the manner of the present invention.

The prior art also does not appear to teach a way to explicitly minimize the set of candidate records to avoid the need for a preliminary geographic qualification step, nor to traverse a list of candidate records by means of their graphical or geographical attributes.

DETAILED DESCRIPTION OF THE INVENTION

Figure 1:
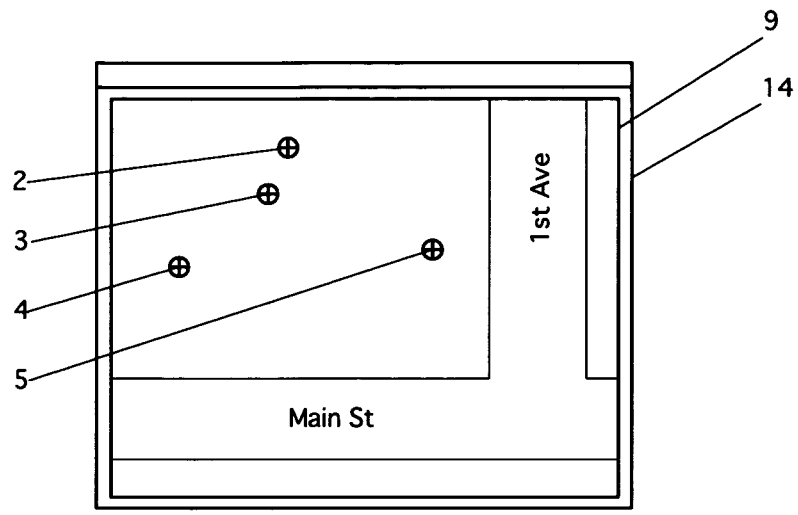
FIG. 1 shows a representative view of a digital map display to which the invention may be applied.

Referring now to FIG. 1, a digital map as known in the art consists in part of a computer program and database (neither shown) containing data describing entities depictable on the map, and one or more interface windows 14 which display a field of depiction 9. Interface window 14 may take the form of a classical window, with title bar, frame, interface elements such as buttons, menus, other controls, and provision for a drawing canvas to comprise field 9 within the client area of window 14. Alternatively window 14 may take the form of a screensaver-style window consisting primarily of a drawing canvas by which field 9 covers the computer screen area. As is known in the art, field 9 typically represents and depicts a geographic region consisting of a portion of a total coverage area of the digital map, and serves to make this region visible to the map user by providing essential interface elements such as a viewing port and electronic drawing medium upon which items residing within that region may be depicted by the computer program in response to user specified states of zoom (magnification) or pan (location) relative to the total coverage area. In this example, field 9 is seen to depict items 2-5. Items 2-5 may represent any sort of geographically locatable items of interest, such as buildings, businesses, street intersections, moving features such as buses whose location is remotely sensed or determined by a fixed or variable schedule, events that take place at a geographic location, or any other mappable geographic feature.

Internally to the database, and in computer program memory as necessary for normal display and interaction functionality typical to a digital map application, items 2-5 are characterized in terms of their location in the real world (for example, their centers, boundaries, corners, or other physical aspects are described by latitude/longitude coordinates or some other "real world" coordinate system such as that provided by an established map projection technique) and in terms of their depiction on screen (that is, in screen or pixel coordinates relative to a designated origin point, such as a home corner of window 14 or field 9, or an offscreen location relative to the coverage area made visible by window 14 or field 9). Access to any additional geographic or non-geographic information relating to items 2-5 and stored in the database is available to the computer program for purposes such as search. As appropriate, items 2-5 may be visually depicted as points, areas, outlined shapes, animated shapes, or any other visual depiction appropriate to the means and purpose of depiction. Alternatively any or all of items 2-5 may be in a nondepicted state, that is, not visible on field 9 but capable of being depicted if desired, the necessary data for visual depiction on field 9 being internally known, accessible, or computable to the computer program. Items 2-5 may be a subset of a larger total population of items represented in the database, and are depictable in field 9 by virtue of their having a physical location within the geographic region currently represented by field 9. Whether depicted or not depicted, items 2-5 are said to be mapped in that they are at minimum knowable to the computer program to reside within the geographic region represented by field 9 (perhaps, for example, by means of database query and/or calculation). By this means items 2-5 comprise a set of mapped items that a user may wish to search with regard to a search criterion.

Suppose now that it is desired, as a user interaction means for the digital map, to evaluate the mapped items in field 9 with respect to a search criterion. To this end a search criterion interface (not shown) is provided as is known in the art to allow user specification of one or multiple search criteria by which mapped items and their associated database records may be evaluated. For example, the interface may include one or more text entry boxes in which the user may type characters representing one or more search terms, such as keywords, categories, or names. The entry box may also recognize characters representing logical operators such as "or" or "and" that act to relate multiple search terms. Alternatively the interface could be more or less complex, for example, an array of checkboxes or radio buttons that allow selection of categories or specification of locations of items to be returned. Optionally there may exist the option of aggregating specific criteria or sets of criteria with each other to form grouped criteria.

In accordance with a unique feature of the invention, optionally the search criterion interface or a related interface may provide a means to associate specific criteria or grouped criteria with specific instances or types of an animated graphic element. The interface may also optionally provide a means to specify a manner of visual modification to be applied to the depictions on the map display of items or specific classes of items that match the criteria. Furthermore the interface may also optionally provide a means to associate said manner of visual modification with specific instances or types of an animated graphic element.

Figure 2:
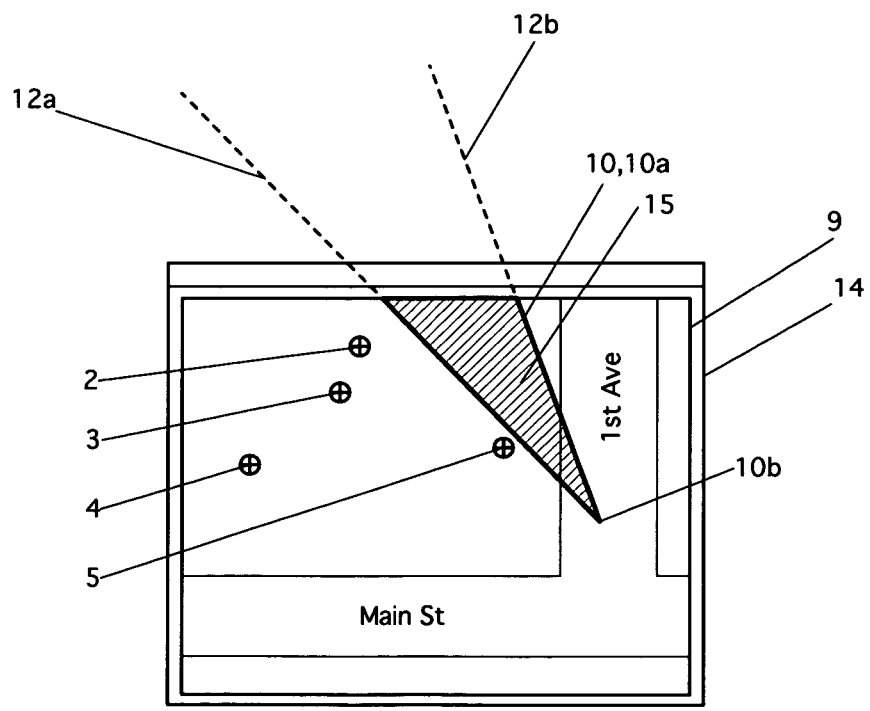
FIG. 2 shows the map display of FIG. 1 upon which a representative graphic element has been projected.

Interaction with the search criterion interface thereby results in the establishment of one or more search criteria that the user wishes to apply to the task of identifying mapped items that match the criteria. To perform the search in the manner of the invention, new and unique means are provided for the application of said search criteria to mapped items and for visual representation of said application and of its outcome. Referring now to FIG. 2, an animated graphic element 10 consists of a shape 10a, its interior region 15 (if any), and optionally a pivot point 10b. Here, shape 10a may be understood as the boundaries of the intersection of field 9 with an infinitely extending wedge-shaped region defined by two rays 12a and 12b emanating from pivot point 10b. Pivot point 10b is here depicted in an onscreen location on field 9, but may alternatively be located in an offscreen area. The wedge-shaped basis of graphic element 10 is shown for purposes of illustration. As will be discussed in later portions of this disclosure, many alternative shape bases may be employed to construct a graphic element 10 having the necessary properties for operation of the invention.

By action of user specification of search criteria as previously described, said criteria thereby become associated with graphic element 10. The association of search criteria with graphic element 10 may be explicit (that is, declared by the user via the search criterion interface) or implicit (that is, associated by default in the absence of user declaration, or associated automatically rather than by user declaration), and in any case is represented internally to the program by means of program variable assignment or data assignment as is common in the art. For purposes of this discussion, the terms "criterion" and "criteria" refer to the one or more criteria or grouped criteria thus associated with graphic element 10.

The invention then performs the search and displays its outcome in a new and unique manner including the steps to be described below. Preferably the steps are performed repeatedly as part of a cycle or programmatic loop that results in a more or less continual repetition of the steps.

First a shape, size, orientation, and position is determined for graphic element 10 relative to the boundaries of field 9. In a preferred embodiment the orientation is determined as an incremental rotation from the rotation employed in a previous projection, that is, previous rotation angles of rays 12a and 12b about pivot point 10b; the shape is determined by intersection of field 9 with a hypothetically infinitely extending wedge defined by rays 12a and 12b; and the position of the shape as established by the location of pivot point 10b is unchanged.

Graphic element 10 is then projected on field 9. The term "projected" as employed in this disclosure includes at minimum an internal representation, by means of program variables and/or data structures, of shape 10*a* and thereby region 15 (if any), relative to field 9, sufficient to determine intersection of mapped items on field 9 with graphic element 10. It may optionally include any combination of (a) visual depiction of one or more boundaries of graphic element 10 on field 9; (b) visual modification of the appearance of the portion of the map that lies beneath the boundaries of graphic element 10 or within region 15, for example, by fading, brightening, darkening, or other modification; (c) visual modification of the depiction of mapped items within the boundaries of graphic element 10 in a manner distinct from the effect of (b); (d) restoration to an original unmodified appearance any regions of the map display, optionally including that of any mapped items, visually modified in a previous cycle due to the projection of graphic element 10 but no longer within the boundaries of graphic element 10 or region 15 in the current cycle. For example, referring to FIGS. 2-5, the projection of graphic element 10 has resulted in the visual depiction of its edges, as well as a general darkening (for example) of the portion of the map underneath it. Furthermore in each successive figure, it may be seen that portions of the map covered by the previous projection of graphic element 10 in a previous figure have been restored to their original appearance, so that only the current projection of graphic element 10 is seen.

Internally, graphic element 10 and region 15 may be represented in terms of screen coordinates (i.e. pixel coordinates local to the viewing window 14/field 9), as physical "real world" coordinates (that is, as latitude and longitude coordinates, or as projected coordinates according to a map projection in feet or other units, or any other "real world" coordinates representing the real world equivalent of the projected location of 10 and 15), or as scaled versions of such coordinates.

Figure 3:
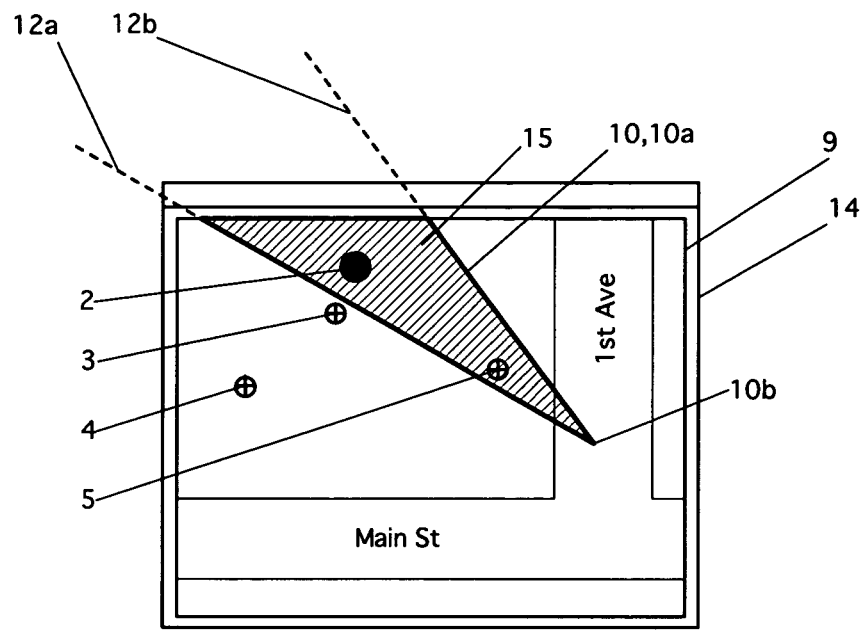
FIG. 3 shows the digital map display of FIGS. 1 and 2 in which the representative graphic element has moved to a position intersecting several mapped items.

Next, target items are identified from the population of depicted and undepicted mapped items in field 9 by means of their geometric intersection with graphic element 10. It may be seen that, depending on the shape, size, and position of graphic element 10 and on the orientation of graphic element 10 about its pivot point 10*b*, it may intersect with various sets of mapped items 2-5, or with no mapped items at all as seen in FIG. 2. In FIG. 3, it may be seen that graphic element 10 has moved to a position in which items 2 and 5 intersect with it, allowing them to become identified as target items. For this purpose, intersection may be determined by an appropriate standard method known in the art, such as a digital computation of intersection applied to the polygons or other data structures employed internally to represent the shape, point, or center point of a target item on screen and the shape that comprises graphic element 10 on screen, conducted in pixel coordinates or a similarly applicable coordinate system. Alternatively intersection may be determined by application of similar operations to polygons or other data structures constructed from "real world" coordinates of said items, or scaled versions of those coordinates, as stored in the database or kept internally by the computer program.

The search criterion associated with graphic element 10 is then applied to the target item or items thus identified. However, optionally and preferably any target items to which the criterion was thereby applied in the immediately previous cycle are not included in the current set of target items, do not receive application of the search criterion in the current cycle, and their previous match outcome is kept unchanged. Application of the search criterion to remaining target items is performed in a manner like that known in the art, such as retrieval of database information associated with an item, and comparison of said information with the search criterion in order to compute or otherwise determine a measure of match, such as a discrete state of match, a degree of match, a class or category of match, or other measure of match.

For those items found to have an appropriate state, degree, class, or other aspect of match, a first modification is determined and applied to the visual appearance of the item on field 9. For example, referring to FIG. 3, suppose that target items 2 and 5 have received application of the search criterion and it was found that item 2 returns a match while item 5 does not match. By way of example it may be seen that item 2 has received a first modification by having been redrawn at a larger size and a darker color than depicted in FIGS. 1 and 2. Item 5 does not show a modified appearance because a first modification has not been performed, owing to its status as a non match. Optionally, for purposes relating to effective visual animation, the desired lack of a first modified appearance for items found to be non matching may be ensured (against possible residual appearance of previous modifications to the same item) by refreshing or redrawing the item in its default unmodified appearance, or by refreshing or redrawing it in a state equivalent to how it should appear after the effects of projection of graphic element 10.

Figure 4:
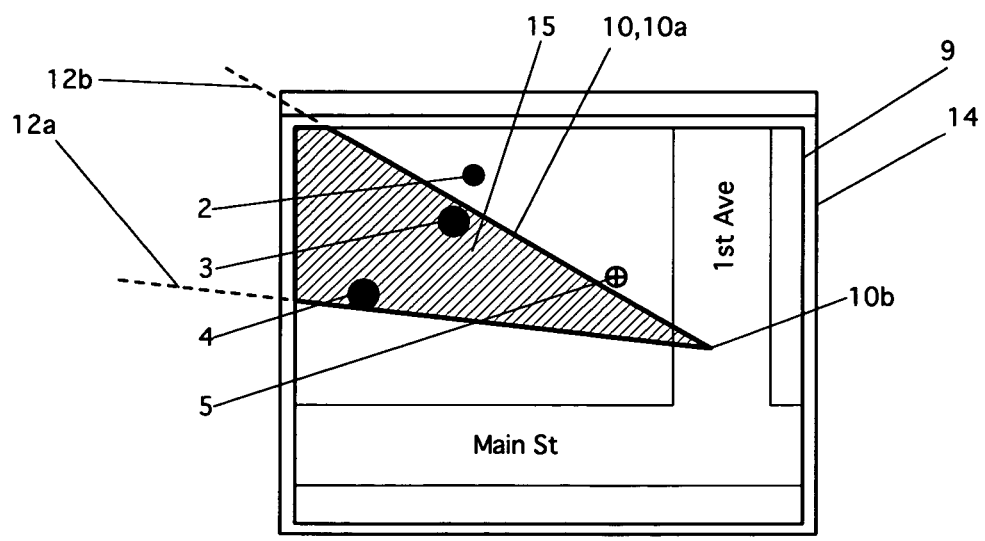
FIG. 4 shows the digital map display of the previous figures in which the representative graphic element has further moved to a position in which previously intersected items are no longer intersected but several other items have become intersected.
Figure 5:
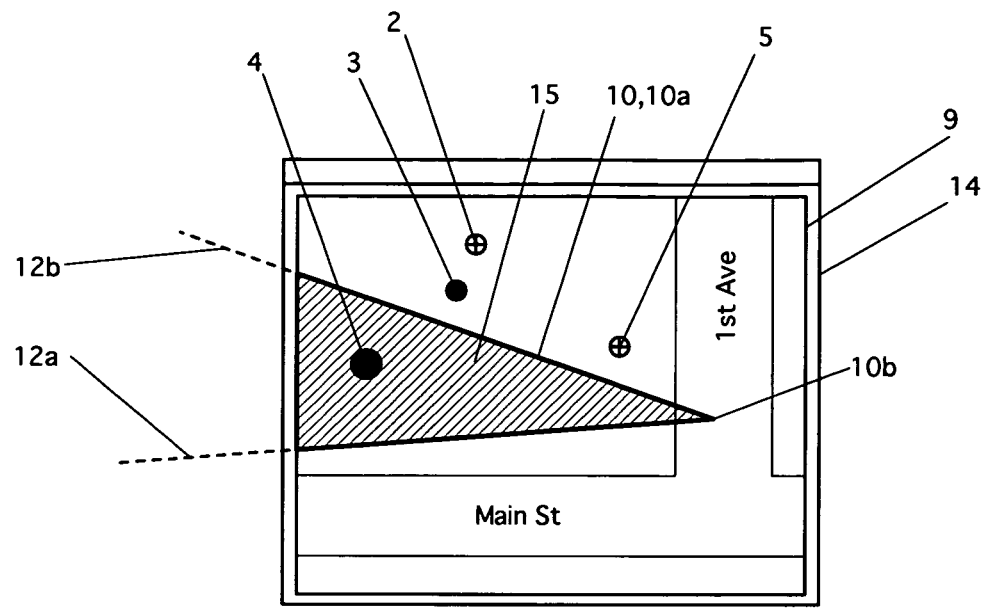
FIG. 5 shows the digital map display of the previous figures in which the representative graphic element has further moved to yet another position in which a yet different intersection of mapped items exists.

The process of first modification of matched items may be followed further by reference to FIGS. 4 and 5. In FIG. 4, one or more cycles have passed, and items 3 and 4 now intersect with graphic element 10. Both have been evaluated as target items in this or a previous cycle and found to match the search criterion, and both are seen depicted in first modified appearance as it was seen previously applied to item 2. Item 2 has not received a first modification resulting from being a match because it is not a target item and therefore cannot be a match. In FIG. 5, one or more additional cycles have passed, and now only item 4 intersects, and so only it is seen in first modified appearance.

Determination of the specific nature of the first modification to be applied to an item may be provided in a number of equally preferable ways. A binary decision may be employed, that is, the modification may be present or absent based on detection or nondetection of a match. For example, if a 20% degree of match is detected for a given target item, that item might be modified by changing its depicted color to red and doubling its original depicted size; if no degree of match is detected, no modification takes place. Alternatively the first modification may be determined discretely, that is, a predefined modification may be selected based upon an absolute or relative measure of match degree. For example, a 20% match degree might result in the selection of the 2nd in a sequence of 10 predefined modification states. Yet alternatively the first modification may be determined continuously, that is, computed as a function of an absolute or relative measure of match degree, scaled linearly or nonlinearly to a range defined by a minimally modified (or unmodified) state and a maximally modified state. For example, a 0% match degree might compute to a 10% brightening of the item's original depicted color; a 20% match degree might compute to a 40% brightening, and a 100% match degree might compute to a maximal 300% brightening. These specific usages of color, size, and percentage of match for the purposes of first modification are by means of example only, as many other possibilities obvious to the reader will fall within the scope and spirit of the invention.

Furthermore the nature of a first modification may additionally or alternatively be determined by reference to a user specified or predefined association of a style of first modification with a class of items, individual items, an instance of a graphic element, or a type or class of graphic element.

Next and optionally, items in field 9 that were depicted in a first modified appearance in a previous cycle or pass of the programmatic loop are considered for a second modification. Second modification need not be a single modification but preferably is one of a series or sequence of primarily progressive incremental modifications to be applied to a given eligible item. Said sequence preferably begins with an initial modification state to be applied at a specified condition following first modification, followed by incremental modification states applied in each cycle or pass, or selected cycles or passes, of the programmatic loop, proceeding toward a terminal modification state. For example, referring to FIG. 4, a subsequent cycle has projected graphic element 10 in a position in which item 2 is no longer a target item. Because item 2 in a previous cycle had received a first modification, item 2 may be eligible to receive second modification. Eligibility is based in part on consideration of a delay condition and on the state of progress of any already initiated second modification pertaining to the item, in a manner to be discussed. In this example for illustrative purposes suppose that item 2 is found eligible. It may be seen that item 2 has thus received a second modification consisting, for example, of redrawing in a smaller size than provided by the first modification.

Because of the incremental nature of the preferred manner of second modification, it should be noted that, depending on the degree of incremental movement of element 10 provided in each cycle or pass of the programmatic loop, the state of the map display as depicted in FIG. 4 may have been preceded by a number of previous states in which item 2 was found eligible for second modification and thereby received previous increments of said second modification sequence. For example, the initial modification state may have been applied in the first cycle following the application of the first modification, and may have consisted of an incremental shrinking of the size of item 2 from its first modified size. In the next cycle, a further incremental shrinking may have been applied, and so on, until item 2 reached the size that happens to be depicted in FIG. 4. Finally, after additional cycles, it reached a terminal modification state to appear as depicted in FIG. 5.

The specific nature of second modification to be applied to an item may additionally or alternatively be determined by reference to a user specified or predefined association of a style of second modification with a class of items, individual items, an instance of a graphic element, or a type or class of graphic element.

Eligibility of a first modified item for second modification optionally may depend in part on the state of a specified delay condition. The initial second modification state (that is, the initiation of the second modification sequence) may optionally take place without delay, in the cycle immediately following the application of the first modification. Alternatively it may be specified to take place after a specified delay, the purpose of which is to prolong the perceived period of first modification prior to initiation of second modification. Delay may be expressed in terms such as number of cycles passed, degree of incremental rotation or movement of the projected graphic element 10, elapsed time, or any other terms by which delay may be implemented. If a delay is specified, intermediate cycles that take place while the delay is active preferably maintain the onscreen depiction of the item in its first modified state, rather than restoring the item's unmodified appearance or initiating a second modification sequence.

An alternative means of achieving an effective prolongation of the first modification state is to specify no delay while providing for a second modification sequence in which a sufficient initial portion of the sequence consists of states similar to or the same as the first modification state.

A further alternative and preferable means of achieving prolongation of the first modification is to initiate the second modification sequence upon the event in which an item that has received first modification since last newly found to intersect graphic element 10 is found to no longer intersect graphic element 10. In this case, in cycles following application of first modification and prior to initiation of second modification, the onscreen depiction of the item is maintained in its first modified state.

Eligibility for a second modification may also depend on the current state of progress of any already initiated sequence of second modifications of the item. Specifically a previously first modified item shall be eligible for continuation of a second modification sequence only if the terminal second modification state of that instance of the sequence has not been reached and applied.

In FIG. 5, by way of example it may be seen that the terminal modification state of item 2 is the original unmodified appearance of item 2 as it appeared in FIGS. 1 and 2. Alternatively the terminal state may be different from the original appearance.

The conditions to be fulfilled in order to apply the terminal modification, that is, to end the sequence of second modifications, may be any appropriate set of conditions. For example, the sequence of second modifications may be fixed at a specific number of incremental modifications each to be applied in a successive pass or selected passes of the programmatic loop and terminating with the terminal modification. Alternatively the sequence may be executed selectively so as to generally progress from the initial modification to the terminal modification in a given span of time rather than over a fixed number of loop passes.

Additionally, under certain conditions a terminal second modification may be applied immediately, or a second modification sequence simply terminated, for reasons unrelated to its progress. For example, consider the situation in which graphic element 10 sweeps field 9 at a rate that allows a given matching item to be swept twice in less time than it typically takes a second modification sequence to complete. In this situation a first modification resulting from the second sweep would be ordered before the second modification sequence resulting from the previous sweep has completed. In this case the application of the new first modification takes precedence over continuation of a previous second modification sequence, and said second modification sequence is terminated.

As previously pointed out, in a preferred embodiment the steps described above are implemented in a repetitive cycle or programmatic loop, such that changes in the projection of graphic element 10 more or less continually occur, resulting in apparent animation of graphic element 10 relative to field 9, and by means of the steps described above there is provided a more or less continual application of the associated search criterion to a varying set of intersected mapped items and a more or less continual visual representation of these applications and their outcome. Optionally interface means may be provided for the user to start and stop this repetitive cycle at will in a manner commonly provided in user interface design, such as by the provision of checkboxes, buttons, or menu options. Also optionally the repetitive cycle may operate in a continuous operation mode without the need for user activation, such as an automatically activated feature of a screen-saver application that displays and searches a digital map.

Details such as the scale or scope of the programmatic loops that variously act to carry out the steps may vary in ways that are typically within the discretion of those skilled in the art, without departing from the spirit and scope of the invention. For example, all target items that intersect with graphic element 10 might be identified before the next step of applying the search criterion to each of the items is begun; or alternatively, the search criterion may be applied immediately as each individual item is identified. Similarly, the first modification might be applied to an individual matching item immediately after its matching status has been determined; or the first modification may be applied to matching items after matching status has been determined for all target items.

Furthermore, the addition or detailing of intermediate steps naturally supportive of those described above would not constitute new and unique features not already covered by the spirit and scope of the invention. For example, for the purposes of effective onscreen animation, supportive steps such as refreshing of portions of a screen image at appropriate junctures so as to prevent flicker, or restoration of screen pixels modified in the course of normal animation, are well known in the art and would be expected to be present in any process that employs simple animation such as does the invention.

Similarly, minor changes in sequencing of specific actions normally within the discretion of a computer programmer or other person practicing the art do not constitute unique embodiments outside of the spirit and scope of the invention. For example, for the purpose of optimizing speed or smoothness of onscreen animation, a person skilled in the art may elect to postpone execution of any visual portion of the "projection" step (as previously defined) so as to be performed in the same drawing routine as the first modification of matching items.

Having become familiar with the "sweeping" function of the wedge-shaped graphic element 10 employed in the above description, it will become obvious to anyone that other shapes may be employed without departing from the spirit or scope of the invention. For example, graphic element 10 may instead be modeled after a non-areal shape that does not create a distinct area of intersection analogous to interior region 15. Graphic element 10 may be an areal shape that defines a boundary (edge) and an area contained by it, either or both of which may be used for purpose of geometric intersection, or it may be a non-areal shape that defines only a boundary, such as for example a line, or curve, or polyline (a compound line consisting of multiple connected line segments and/or curves), or the boundary (only) of an areal shape, in which cases only the boundary would be used for the purpose of geometric intersection. Assessment of intersection of such non-areal elements with depicted or non-depicted areal representations of mapped items is straightforward via known methods for determining line-area intersection. Alternatively an internal areal representation of a non-areal graphic element, or of mapped items originally represented by points or other non-areal geometry, may be constructed for intersection purposes by expansion by a buffer of fixed width or radius.

Graphic element 10 could also be modeled after many other alternative shapes that do or do not rotate about a pivot point. For example, referring to FIG. 6, graphic element 20 is modeled after a circular wave emanating from, or alternatively toward, center point 20*b* and represented by the portion 20*a* of circle 22 that intersects with field 9. The sweeping function previously exemplified by the incremental rotation of wedge shaped graphic element 10 (FIGS. 2-5) about a pivot point is here instead embodied by the incremental growth or alternatively shrinking of the diameter of circular element 20/22 about a center point. Alternatively to the circle basis of FIG. 6, graphic element 20 could be embodied by a ring-shaped region or a circular region. Many other similar variations will be obvious to the reader while remaining within the spirit and scope of the invention.

A graphic element with the necessary features for operation of the invention may take any shape, even a randomly varying or amorphous shape, as long as said shape is capable of "sweeping" any portion of field 9, that is, by being projected on field 9 in variable shape, size, position, or orientation so as to identify by intersection a varying set of mapped items for application of an associated search criterion. This desired variability in the properties of intersection of an element with field 9 may be achieved not only by rotation of an element about a fixed point but alternatively by rotation about a moving point, or changing of shape, or growing or shrinking in size about a center point or any arbitrary point, or translation across field 9, or any other means by which a change in properties of intersection of the element with field 9 from cycle to cycle may be achieved. All such variations lie within the scope of the invention.

The invention is not restricted to the use of a single graphic element 10/20 but may include multiple graphic elements of different types or styles. In this way multiple shapes may be made to sweep field 9 simultaneously, each applying its own search criterion and optionally its own set of first and second modifications and related criteria to the target items it encounters. For example, a wedge shape might be used to sweep a field of items with respect to one associated search criterion (concerned, for example, with the identification of restaurants), while a ring-shaped region might be used to sweep the same field of items with respect to a different criterion (for example, concerned with identifying grocery stores that are open after 9 pm). On matching the first criterion, a target item might, for example, glow in a bright color for its first modification and gradually fade back toward its original color via a sequence of second modifications; and those that match the second criterion might grow in size as a first modification and gradually shrink back down to normal via a sequence of second modifications. An item that matches both criteria might receive incremental steps of both second modification sequences in an alternate manner, or receive incremental steps of one sequence until interrupted by the initiation of another.

Another variation recognizes the use of multiple instances of a type or style of graphic element. For example, consider the circular wave example of FIG. 6. Here instead of a single circle, multiple circles of different diameter might be centered on center point 20*b*, comprising multiple instances of the circular style graphic element 20 that may each independently act in the manner of the invention.

Likewise the association of a search criterion with a sweeping graphic element is not limited to association of a single criterion with a single graphic element or population of elements, but could include multiple criteria associated with a single element, or differing sets of single or multiple criteria associated with each of a population of elements. Many variations will be apparent and lie within the spirit and scope of the invention.

Figure 6:
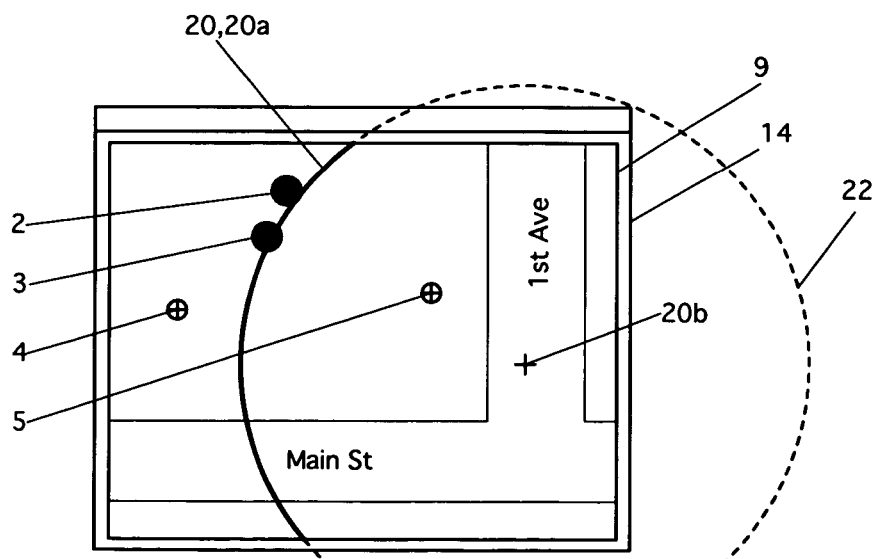
FIG. 6 depicts an alternate embodiment in which the graphic element of FIGS. 2-5 is replaced by an outwardly radiating circle, representative of many alternate graphic element bases that could be used in the invention.

In an alternate embodiment, for the purposes of identifying target items by intersection, graphic element 10 (or 20 in FIG. 6) includes portions offscreen from field 9, which in the previous embodiment were excluded from the definition of graphic element 10 (or 20 in FIG. 6) because they did not intersect with field 9. For example, in FIGS. 2-5, the additional area would include any or all of the offscreen portion of the hypothetically infinitely extending wedge defined by rays 12*a* and 12*b*. In FIG. 6, the additional portion would include any or all of the offscreen portion of circle 22. This alternate embodiment adds to the previous embodiment the ability to include in the search any items not mapped in field 9 and therefore not capturable by the onscreen portion of the graphic element, but whose offscreen mapped location relative to field 9 would intersect the graphic element if field 9 were large enough. Because onscreen depiction of first and second modifications of offscreen matching items may not be possible due to the offscreen location of these items, preferably offscreen matching items are presented in a different way. For example, a list or table of offscreen matching items may be made available to the user via an interface element separate from or overlaid upon field 9. As another example, each matching offscreen item might be depicted via first and/or second modification and/or with special annotation, at a selected onscreen location, for example, at a point near an edge of field 9 closest to the offscreen location of the item.

Recognizing that the invention as described utilizes a varying geometric intersection that results from relative movement of a shape with respect to a map depiction, and recognizing that the resultant identification of a varying set of intersecting mapped items for application of a search criterion is a desirable effect for preferred operation of the invention, the invention may alternatively employ graphic element(s) stationary relative to field 9, and a map depiction that incrementally moves relative to field 9.

Having described these specific embodiments and variations, many variations in the nature of the sweeping graphic element, the nature and method of visual modification of matched target items, and other new and unique aspects of the invention will be apparent and will fall within the spirit and scope of the invention. Furthermore, having described here the preferred steps in carrying out the invention, it must be noted that these steps are merely illustrative of an anticipated mode of carrying out the invention and in no way limit claim of the broader new and unique features that are at the heart of the invention. Most broadly the spirit and scope of the invention may be seen to include any means of achieving for a digital map the animated visual display of the application of a search criterion to mapped items and of the outcome of said application, in which the identification and evaluation of target items for search is determined by and reactive to the movement of a projected shape across a digital map display.

The invention claimed is:

1. A method for depicting features on a digital map display, comprising:
    associating (a) one or more search criterion applicable to features mappable on said digital map, with (b) one or more instance or class of one or more graphic element displayable on the map display, said graphic element defining at least a distinct geometric boundary with respect to a coordinate system of said digital map; and
    a repetitive loop including:
        applying a predetermined incremental change to the angular rotation of said graphic element relative a coordinate system of the digital map;
        projecting said graphic element visibly or invisibly on the map display;
        identifying one or more mapped or mappable feature as a target feature by determining that its mapped or mappable depiction on the map display would geometrically intersect with the projected graphic element;
        applying said search criterion associated with said graphic element to an evaluation of database information associated with said target feature so as to determine an outcome representing state, degree, class, or other aspect of matching between said search criterion and said target feature;
        determining a first temporary modification of the visual appearance of a matching target feature based on said outcome; and
        applying said first temporary modification to the visual appearance of said matching target feature;
    and wherein said graphic element is substantially a wedge shape originating at a point on or off the map display and extending for a finite distance from said point;
    and wherein said predetermined incremental change is part of a repeating sequence of predetermined incremental changes.

2. The method of claim 1 wherein:
said predetermined incremental change is an angular rotation about said point; and
said identifying of said target feature is by determining that its mapped or mappable depiction on the map display would geometrically intersect with the area contained by the boundary of said projected graphic element.

3. The method of claim 2 wherein:
said graphic element includes only that portion which is displayable on the map display.

4. The method of claim 1 wherein:
said graphic element is a line, curve, or polyline that includes a point on or off the map display and extending for a finite distance from said point; and
said predetermined incremental change is an angular rotation about said point.

5. The method of claim 1 wherein:
said graphic element is a two-dimensional area; and
said identifying of said target feature is by determining that its mapped or mappable depiction on the map display would geometrically intersect with the boundary of said projected graphic element.

6. The method of claim 1 wherein said determining a first modification, and said applying said first modification, occur only if said outcome meets a first threshold.

7. The method of claim 1 wherein the temporary nature of said temporary modification is provided by removing said first modification of the visual appearance of a matching target feature after the mapped or mappable depiction of said matching target feature is found to no longer intersect the graphic element.

8. The method of claim 1 wherein the temporary nature of said temporary modification is provided by applying to matching target features that were first modified in a previous cycle of said repetitive loop a second modification consisting of one or more increments or members of a predetermined or computed sequence of modifications.

9. The method of claim 8 wherein said predetermined or computed sequence of modifications restores the original appearance of the target feature as it appeared prior to its first modification.

10. The method of claim 1 wherein said incremental change to an angular rotation of the graphic element relative a coordinate system of the digital map is provided by incremental rotation of the depicted map view relative the graphic element.

11. The method of claim 1 additionally comprising graphical representation of the act of application of the search criterion by means of temporary modification of visual appearance of target features.

12. The method of claim 1 wherein the graphic element is considered to extend beyond the depicted portion of the map display and thereby identifies as target features mapped or mappable features that would be located off the map display.

13. The method of claim 1 additionally comprising temporary modification of appearance of the portion of the map display that intersects with the graphic element.

14. A digital map display apparatus, comprising:
- a computer having a screen, comprising a digital map display;
- the computer being programmed to:
- display a view of a digital map on the screen;
- to animate one or more graphic element on said digital map, each graphic element comprising at least a distinct geometric boundary with respect to a coordinate system of said digital map, and being animated to show a series of predetermined incremental rotations;
- to associate with each graphic element a set of one or more search criterion applicable to features mapped or mappable on said digital map;
- to identify a mapped or mappable feature as a target feature by determining that the feature if mapped in said coordinate system would have geometric intersection with a graphic element at an increment of its rotation;
- to determine an outcome representing state, degree, or class of match between database information associated with said target feature and said set of one or more search criterion associated with the graphic element; and
- to graphically represent said outcome by means of temporary modification of visual appearance of said target feature on the map display;

and wherein said graphic element is substantially a wedge shape originating at a point on or off the map display and extending for a finite distance from said point.

15. The apparatus of claim 14, wherein:
said predetermined incremental rotation is an angular rotation about said point, and
said geometric intersection of said feature is with the area within the boundary of the graphic element.

16. The apparatus of claim 15, wherein:
said graphic element includes only that portion which is displayable on the map display.

17. The apparatus of claim 14 wherein:
said graphic element is a line, curve, or polyline that includes a point on or off the map display and extending for a finite distance from said point; and
said predetermined incremental rotation is an angular rotation about said point.

18. The apparatus of claim 14 wherein:
said graphic element is a two-dimensional area; and
said geometric intersection of said feature is with the boundary of said graphic element.

19. The apparatus of claim 14, additionally comprising:
the computer having one or more input device,
the computer being programmed to provide a user interface by which said set of one or more search criterion may be specified and associated with said each graphic element by means of said one or more input device.

* * * * *